United States Patent
Kaneko et al.

(10) Patent No.: US 11,197,421 B2
(45) Date of Patent: Dec. 14, 2021

(54) WORK EQUIPMENT

(71) Applicant: HONDA MOTOR CO., LTD., Tokyo (JP)

(72) Inventors: Runa Kaneko, Wako (JP); Koji Kuriyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 308 days.

(21) Appl. No.: 16/472,095

(22) PCT Filed: Dec. 12, 2017

(86) PCT No.: PCT/JP2017/044603
§ 371 (c)(1),
(2) Date: Jun. 20, 2019

(87) PCT Pub. No.: WO2018/123568
PCT Pub. Date: Jul. 5, 2018

(65) Prior Publication Data
US 2019/0313580 A1 Oct. 17, 2019

(30) Foreign Application Priority Data

Dec. 26, 2016 (JP) .............................. JP2016-252092

(51) Int. Cl.
*H02J 7/00* (2006.01)
*A01D 43/063* (2006.01)
(Continued)

(52) U.S. Cl.
CPC ......... *A01D 43/0631* (2013.01); *A01D 34/63* (2013.01); *A01D 34/71* (2013.01);
(Continued)

(58) Field of Classification Search
CPC .. A01D 43/0631; A01D 43/063; A01D 34/63; A01D 34/78; A01D 34/71;
(Continued)

(56) References Cited

U.S. PATENT DOCUMENTS

2019/0070967 A1* 3/2019 Ishigaki .................. B60L 8/003
2019/0075724 A1* 3/2019 Becke ..................... A01D 69/02

FOREIGN PATENT DOCUMENTS

EP 2143315 A1 * 1/2010 ......... A01D 43/0635
JP H02-51708 2/1990
(Continued)

OTHER PUBLICATIONS

International Search Report, 2 pages, dated Jul. 5, 2018.

*Primary Examiner* — Zixuan Zhou
(74) *Attorney, Agent, or Firm* — Rankin, Hill & Clark LLP

(57) ABSTRACT

A work equipment that can temporarily store an article that is collected while traveling, and includes a work equipment main body, a container device configured to store the article collected by the work equipment main body while being connected to the work equipment main body, and to travel to and back from a collected article destination by being detached from the work equipment main body, a travel drive unit configured to cause the container device to travel, a battery mounted to the container device to power the travel drive unit, a battery state of charge sensor configured to detect a remaining battery charge of the battery, and a control unit that determination whether the container device may be detached from the work equipment main body or not according to the remaining battery charge.

20 Claims, 12 Drawing Sheets

(51) Int. Cl.
*A01D 34/71* (2006.01)
*G05D 1/02* (2020.01)
*B60K 1/04* (2019.01)
*B60L 50/60* (2019.01)
*B60W 10/26* (2006.01)
*A01D 34/78* (2006.01)
*H01M 10/44* (2006.01)
*B60L 58/12* (2019.01)
*E01H 1/04* (2006.01)
*A01D 34/63* (2006.01)
*A01D 101/00* (2006.01)
*A01D 34/64* (2006.01)

(52) U.S. Cl.
CPC .......... *A01D 34/78* (2013.01); *A01D 43/063* (2013.01); *B60K 1/04* (2013.01); *B60L 50/66* (2019.02); *B60L 58/12* (2019.02); *B60W 10/26* (2013.01); *E01H 1/047* (2013.01); *G05D 1/02* (2013.01); *H01M 10/448* (2013.01); *A01D 34/64* (2013.01); *A01D 2101/00* (2013.01); *B60K 2001/0438* (2013.01)

(58) Field of Classification Search
CPC .... A01D 34/64; A01D 2101/00; E01H 1/047; H01M 10/448; B60L 58/12; B60L 50/66; B60W 10/26; B60K 1/04; B60K 2001/0438; G05D 1/02
USPC .......................................... 320/104, 103, 109
See application file for complete search history.

(56) References Cited

FOREIGN PATENT DOCUMENTS

| | | |
|---|---|---|
| JP | 2003-189718 | 7/2003 |
| JP | 2006-006144 | 1/2006 |
| JP | 2006-034432 | 2/2006 |
| JP | 2006-321583 | 11/2006 |
| JP | 2010-148403 | 7/2010 |
| JP | 2010-243884 | 10/2010 |
| JP | 2013-031389 | 2/2013 |
| JP | 2013-113874 | 6/2013 |
| JP | 2015-092845 | 5/2015 |

* cited by examiner

WORK EQUIPMENT

TECHNICAL FIELD

The present invention relates to work equipment such as a lawn mower, a grass cutter, a harvester and a sweeper, and in particular to work equipment that is configured to temporarily store an article that is collected as the work equipment travels.

BACKGROUND ART

A lawn mower is provided with a mowing blade for mowing the lawn, and a grass container (grass collecting container) for containing the mowed grass clippings. When the grass container has become full, the mowed grass clippings in the grass container are discarded. In a certain lawn mower, the grass container is detachable from the mower main body so that the detached grass container may be transported to a prescribed disposal area to discard the grass clippings. See Patent Document 1, for instance. In another lawn mower, the grass container can be tilted with respect to the mower main body so that the mowed grass clippings can be discarded from the grass container by tilting the grass container. See Patent Documents 2 and 3, for instance.

Patent Document 1: JP2010-148403A
Patent Document 2: JP2003-189718A
Patent Document 3: JP2015-92845A

SUMMARY OF THE INVENTION

Task to be Accomplished by the Invention

In the case where the grass container is to be transported to an area for discarding the mowed grass clippings, the grass container can be transported by an operator if the grass container is not bulky or heavy, but transportation equipment such as a cart may be required if the grass container is bulky or heavy. Therefore, the transportation of the grass container detached from the machine main body requires a substantial amount of manual work, and the burden on the operator is undesirably great.

In the case where the grass container is tilted to discard the mowed grass clippings, the operator is not required to transport the grass container, but the lawn mower must travel to the area where the mowed grass clippings are to be discarded or, alternatively, a truck or any other form of hauling equipment is required to be brought beside the lawn mower. In either case, a relatively large piece of equipment is required to travel from one place to another every time mowed grass clippings are required to be discarded, and energy efficiency and work efficiency are both poor.

Such a problem associated with the task of discarding the mowed grass clippings from a grass container is present also in the case of removing or emptying a container storing an article collected by any other form of work equipment (such as a grass cutter, a harvester and a sweeper) from the container.

The inventors of this application have thus carried out research work, and developed a battery powered container device that can travel between a current position of the work equipment and a destination position to which the collected article is to be transported, and discharge the collected article at the destination position. However, this solution has a problem that the container device may be unable to return to the current position of the work equipment if the battery charge of the container device runs out during the trip to and back from the destination position, and the container device becomes unable to be reunited with the machine main body.

In view of such a problem associated with work equipment having a battery powered container device that can be detached from the work equipment main body and can travel by itself, a primary object of the present invention is to provide work equipment in which the detached container device can be prevented from becoming unable to be reunited with the power equipment main body due to an insufficient state of charge of the battery.

Means to Accomplish the Task

To achieve such an object, the present invention provides work equipment (10) that can temporarily store an article that is collected while traveling, comprising: a work equipment main body (20); a container device (70) configured to store the article collected by the work equipment main body while being connected to the work equipment main body, and to travel to and back from a collected article destination (202) by being detached from the work equipment main body; a travel drive unit (80) configured to cause the container device to travel; a battery (112) mounted to the container device to power the travel drive unit; a battery state of charge sensor (114) configured to detect a remaining battery charge of the battery; and a control unit (54, 104) configured to perform determination of whether the container device may be detached from the work equipment main body or not according to the remaining battery charge.

Thereby, in the work equipment that is provided with a container device that can be detached from the work equipment main body and travel by being powered by a battery, the control unit determines whether the container device may be detached from the work equipment main body or not according to the remaining battery charge so that the container device after being detached from the work equipment main body is prevented from becoming unable to return to the work equipment main body.

In the above arrangement, preferably, the work equipment further comprises an own position detection unit (106) configured to generate position information of the work equipment, wherein the control unit is configured to determine a required remaining battery charge that is required for the container device to travel according to a current position of the work equipment in a stationary state provided by the position information and a position of the collected article destination, and to permit the container device to be detached from the work equipment main body when the detected remaining battery charge is equal to or greater than the required remaining battery charge.

Since the required remaining battery charge is determined from the current position of the work equipment and the position of the collected article destination, the determination if the container device may be detached from the work equipment main body or not can be performed in an appropriate manner.

In the above arrangement, preferably, in this arrangement, the control unit is configured to determine a travel route (300) for the container device to travel to the collected article destination and back to the work equipment main body according to the current position of the work equipment in the stationary state and the position of the collected article destination, and to determine the required remaining battery charge according to a length of the travel route.

Since the required remaining battery charge is determined according to the length of the travel route that is to be used by the container device to travel to the collected article destination and back to the work equipment main body, the determination if the container device may be detached from the work equipment main body or not can be performed in an appropriate manner.

In the above arrangement, preferably, the control unit is configured to acquire position information on an obstacle (210) that is located between the current position of the work equipment main body in the stationary state and the collected article destination, and determine the travel route so as to avoid the obstacle.

Since the required remaining battery charge is set based on the length of the travel route while taking into account the obstacle existing between the current position of the work equipment main body and the collected article destination, the determination if the container device may be detached from the work equipment main body or not can be performed in an even more appropriate manner.

In the above arrangement, preferably, the container device is configured to unload the collected article at the collected article destination, and the control unit is configured to determine the required remaining battery charge as a sum of a first remaining battery charge that is required for the container device to travel the travel route, a second remaining battery charge that is required for unloading the collected article, and a prescribed remaining battery charge reserve.

Since the required remaining battery charge is determined as a sum of a first remaining battery charge that is required for the container device to travel the travel route, a second remaining battery charge that is required for unloading the collected article, and a prescribed remaining battery charge reserve, the determination if the container device may be detached from the work equipment main body or not can be performed in an even more appropriate manner.

In the above arrangement, preferably, the work equipment further comprises an article collection state sensor (120) for detecting an article collection state of the container device, wherein when detachment of the container device from the work equipment main body is permitted according to the remaining battery charge, the control unit is configured to neutralize the article collection state sensor.

According to this arrangement, when the container device is detached, unnecessary detection by the article collection state detection sensor can be avoided so that malfunction or the like of the work equipment due to the detection result of the article collection state detection sensor can be avoided.

In the above arrangement, preferably, the work equipment further comprises an article collection state sensor (120) for detecting an article collection state of the container device, wherein the own position detection unit is configured to be activated according to a detection result of the article collection state sensor.

Since the own position detection unit is activated as required according to the detection result of the article collection state sensor, unnecessary power consumption by the own position detection unit due to constant operation of the own position detection unit can avoided.

In the above arrangement, preferably, when detachment of the container device from the work equipment main body is not permitted according to the remaining battery charge, the control unit is configured to charge the battery until the remaining battery charge reaches the required remaining battery charge.

By charging the battery until the required remaining battery charge is obtained, the container device can be made ready for travel while avoiding unnecessary charging time.

In the above arrangement, preferably, the control unit is configured to execute a normal charging mode for charging the battery at a first electric current value, and a rapid charging mode for charging the battery at a second electric current value greater than the first electric current value, and to execute the rapid charging mode when detachment of the container device from the work equipment main body is not permitted according to the remaining battery charge.

By charging the battery at an accelerated rate until the required remaining battery charge is achieved, the container device can be made ready for travel at an earliest possible time.

In the above arrangement, preferably, the work equipment further comprises a coupling device (130) for detachably coupling the container device to the work equipment main body, wherein the control unit is configured to control the coupling device so as to detach the container device when detachment of the container device from the work equipment main body is permitted according to the remaining battery charge.

By controlling the operation of the coupling device, permission and prohibition of the travel of the container device can be executed in a reliable manner.

In the above arrangement, preferably, the work equipment further comprises a collection device (40) provided on the work equipment main body for performing a collecting operation for collecting the article to be collected, wherein the control unit is configured to control the collection device so as to stop the collecting operation when the remaining battery charge is greater than or equal to the required remaining battery charge.

By stopping the collecting operation while the container device travels, unnecessary energy consumption can be avoided, and the safety of the surrounding area can be ensured.

In the above arrangement, preferably, the work equipment further comprises a notifying unit (60) that notifies an operator a result of the determination performed by the control unit by using at least one of light emission, audio output, and image display.

Thereby, the operator can easily recognize the start of the travel of the container device.

Effect of the Invention

The present invention thus provides work equipment having a battery powered container device that can be detached from the work equipment main body and can travel by itself wherein the detached container device can be prevented from becoming unable to be reunited with the power equipment main body due to an insufficient state of charge of the battery.

BRIEF DESCRIPTION OF THE DRAWING(S)

MODE(S) FOR CARRYING OUT THE INVENTION

Work equipment according to an embodiment of the present invention is described in the following with reference to the appended drawings. In this embodiment, the present invention is applied to a riding lawn mower.

Figure 1:
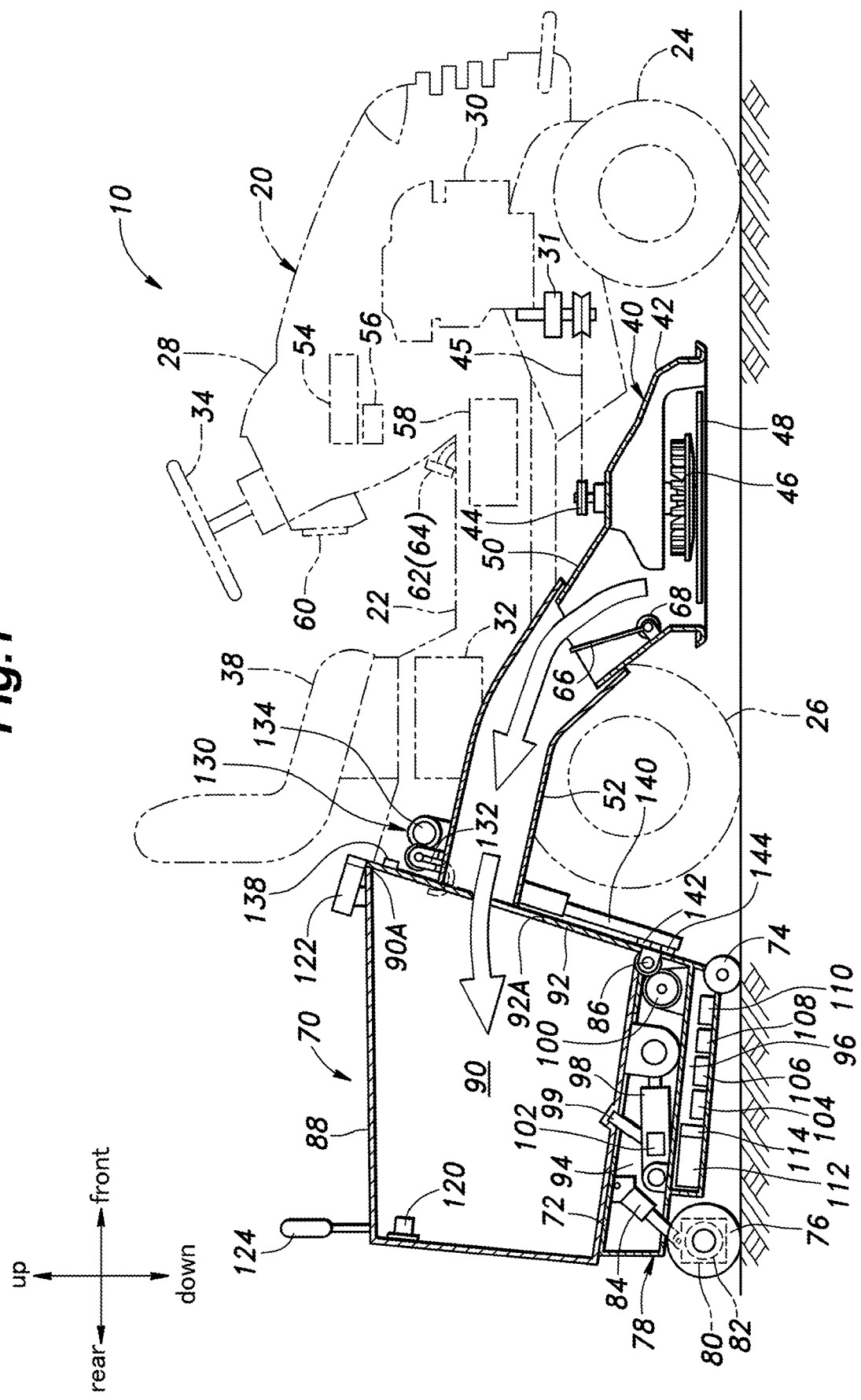
FIG. 1 is a sectional side view of work equipment in the form of a riding lawn mower according an embodiment of the present invention (a sectional side view when a container device for storing grass clippings is lowered)
Figure 2:
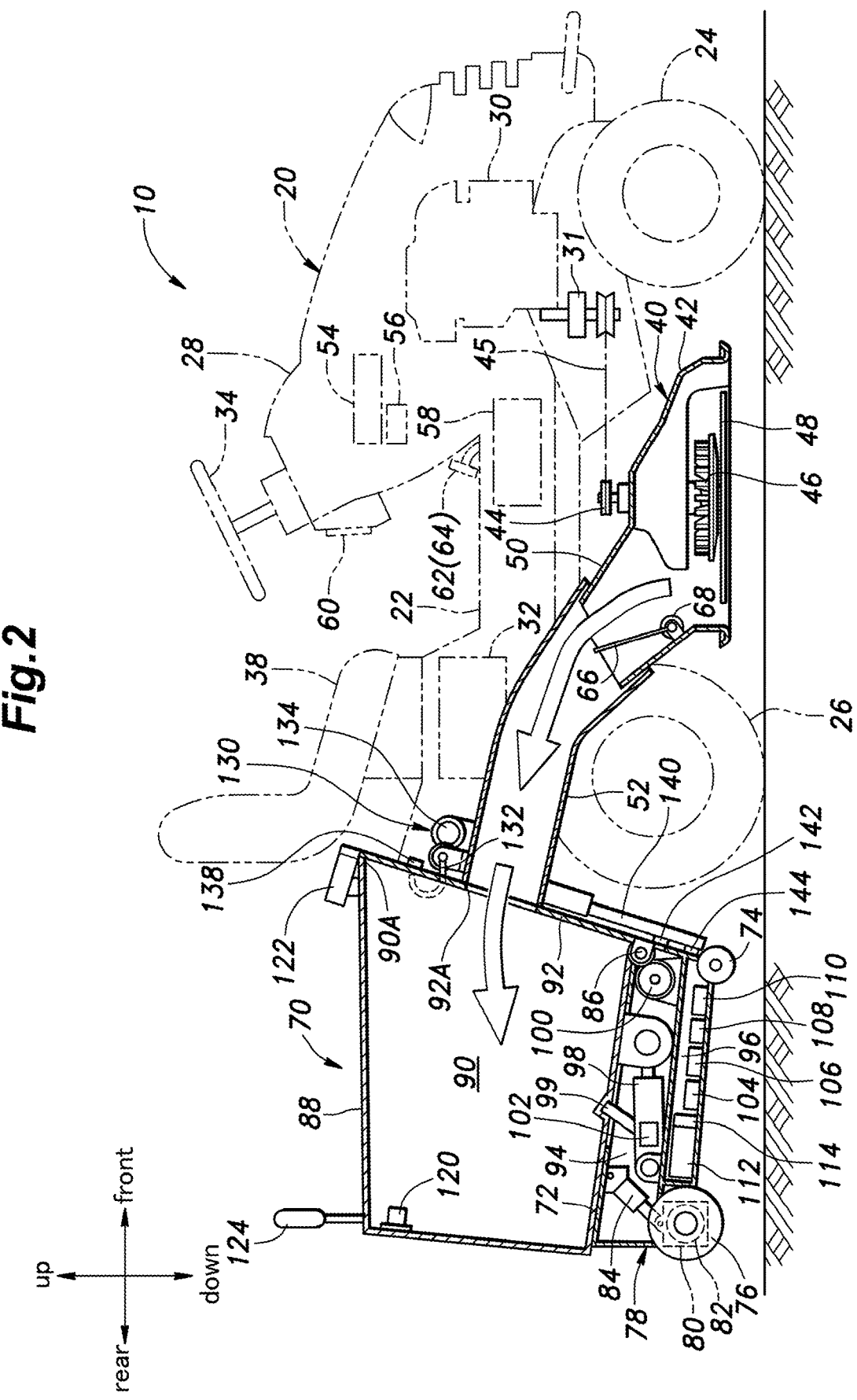
FIG. 2 is a sectional side view of the riding lawn mower according to the present embodiment (a sectional side view when the container device is lifted)

As shown in FIG. 1 and FIG. 2, a mower main body 20 is provided with a main frame 22, a pair of front wheels 24 and a pair of rear wheels 26 provided on the main frame 22, a front vehicle body 28 provided in a front part of the main frame 22, an internal combustion engine 30 provided in the front vehicle body 28, a fuel supply unit 32 including a fuel tank for storing fuel for the internal combustion engine 30 and a fuel pump provided in the main frame 22, a steering wheel 34 provided in the front vehicle body 28, and a driver's seat 38 provided on the front vehicle body 28. The internal combustion engine 30 rotatively drives not only the front wheels 24 but also a fan 46 and a cutting blade 48.

The traveling and braking of the mower main body 20 are controlled by the driver (operator) in the same manner as a conventional riding lawn mower by the operation of an accelerator pedal 62 and a brake pedal 64 provided on the main frame 22.

The mower main body 20 is not required to be a riding lawn mower, but may also be other forms of mowers as long as the mower main body 20 is able to travel at least within a prescribed work area. For instance, the mower main body 20 may be configured to travel autonomously according to a per se known technology. Alternatively, the mower main body 20 may be configured to be remotely controlled by an operator (a worker) according to a per se known technology.

In a lower part of the main frame 22 is provided a work unit consisting of a cutting blade device (a collection device) 40 in the present embodiment. The cutting blade device 40 includes a housing 42 having an opening facing downward, a blower fan 46 and a cutting blade 48 which are positioned in the housing 42, and fitted on a vertical rotary shaft 44. The rotary shaft 44 is connected to the internal combustion engine 30 via a belt transmission mechanism 45 and a clutch 31 in a power transmitting manner, and is rotatively driven by the internal combustion engine 30 in a selective manner.

The housing 42 is provided with a discharge duct 50 for discharging mowed grass clippings. The main frame 22 has a connection duct 52 for connecting the discharge duct 50 to a grass receiving chamber 90 of a container device 70 which will be described hereinafter.

The discharge duct 50 is provided with a shutter 66 for changing the direction of the mowed grass clippings thrown toward the connection duct 52 by the air flow created by the cutting blade 48 and the fan 46, and an electric shutter actuator 68 for changing the angle of the shutter 66.

The mower main body 20 further includes a main body control unit 54 consisting of an electronic control device provided in the front vehicle body 28, a wireless communication unit 56 also provided in the front vehicle body 28 for performing wireless communication with the container device 70, a rechargeable battery 58 provided in the main frame 22, and a operation unit 60 (display unit) provided in the front vehicle body 28. The operation unit 60 may include a LCD panel and a touch panel, or may include switches or the likes, and includes a dump execution button (not shown in the drawings) for dumping or otherwise unloading mowed grass clippings as will be described hereinafter. The battery 58 is charged by a generator (not shown in the drawings) driven by the internal combustion engine 30.

Figure 3:
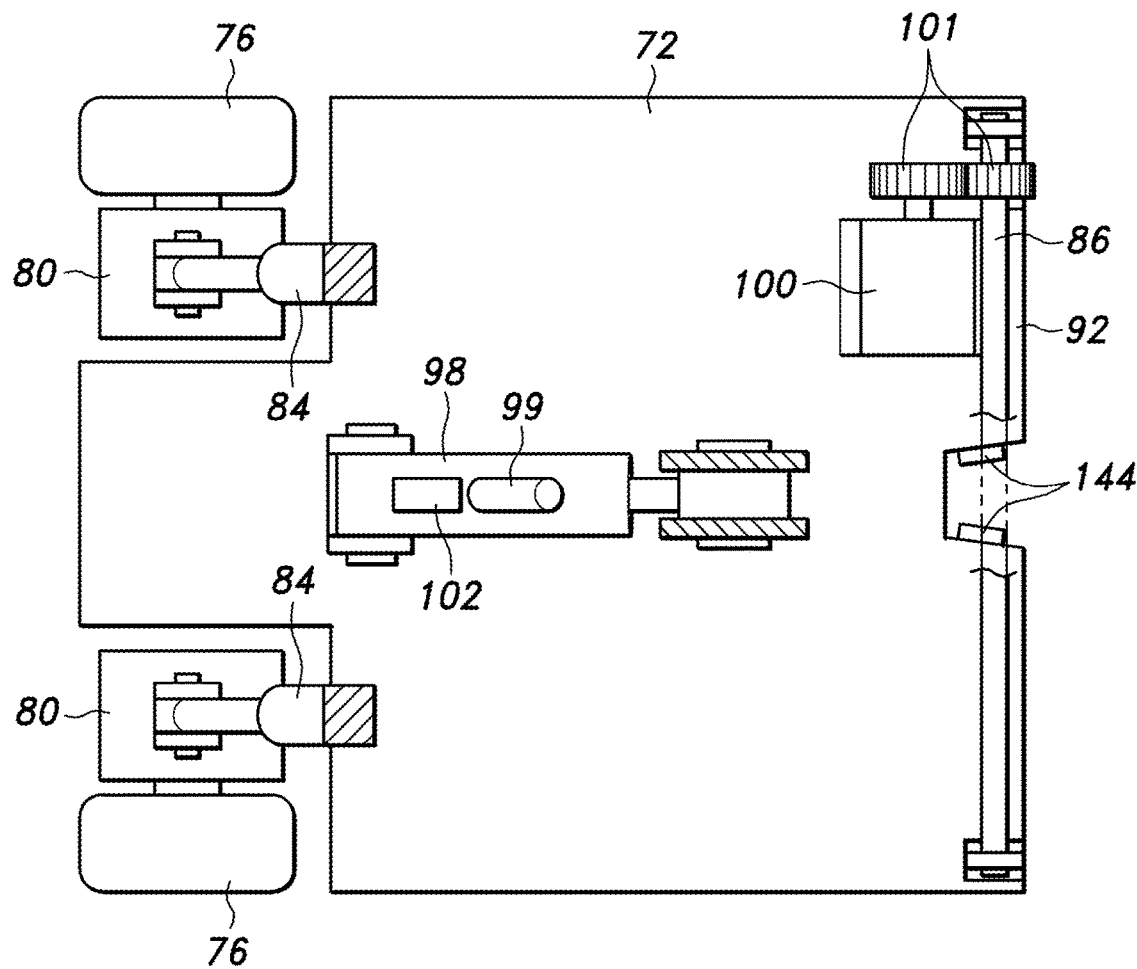
FIG. 3 is a plan view of a machine chamber of the container device of the riding lawn mower according to the present embodiment.

As shown in FIGS. 1 to 3, the container device 70 is provided with an undercarriage 78 including a device frame 72, and a pair of front wheels 74 and a pair of rear wheels 76 supported by the device frame 72, and a travel drive unit 80 including electric motors for individually rotatively driving the right and left rear wheels 76. The travel drive unit 80 is attached to the device frame 72 via a rear wheel lifting actuator 84 (lift actuator) consisting of an electric linear actuator so that the rear wheels 76 can be moved between a lifted position where the rear wheels are raised from the ground surface and a lowered position where the rear wheels 76 are in contact with the ground surface by the extension and retraction of the rear wheel lifting actuator 84.

The device frame 72 supports a grass container 88 so as to be tiltable (dumping operation) around a support shaft 86 extending laterally in a front part of the device frame 72.

The grass container 88 has a substantially rectangular box shape defining a grass receiving chamber 90 for receiving the mowed grass clippings (collected article) from the cutting blade device 40, and is provided with a content discharge opening 90A extending over an entire front area thereof. The support shaft 86 is fitted with a gate plate 92 so that the gate plate 92 opens and closes the content discharge opening 90A as the support shaft 86 rotates. The grass container 88 and the gate plate 92 have a common center line of rotation (tilting movement) provided by the support shaft 86.

Figure 4:
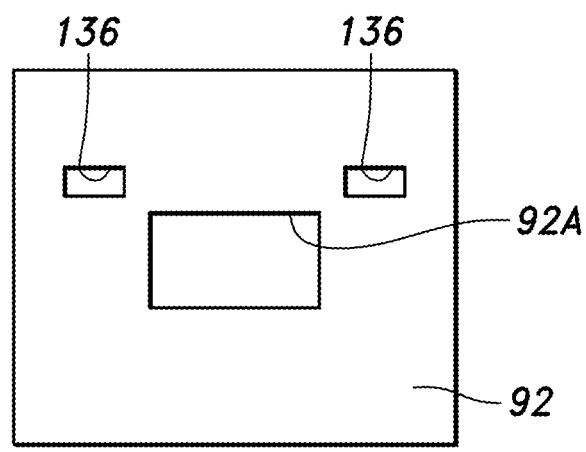
FIG. 4 is a front view of a gate plate of the riding lawn mower according to the present embodiment.

As shown in FIG. 4, the gate plate 92 is formed with a grass inlet opening 92A. As shown in FIG. 2, when the container device 70 connected to the mower main body 20 is in the lifted position, the grass inlet opening 92A aligns with the outlet of the connection duct 52. In addition, the grass container 88 is provided with an exhaust region (not shown in the drawings) which allows air to pass through, but does not allow the grass to pass through.

A pressure sensor (collected article detection sensor) 120 is provided in the grass container 88 for detecting the internal pressure of the grass receiving chamber 90 in order to detect the amount of the mowed grass clippings stored in the grass receiving chamber 90. An upper part of the grass container 88 is provided with a camera 122 serving as an environment sensor for detecting the environment surrounding the container device 70 and a warning unit 124 including a red lamp or the like.

The device frame 72 defines a machine chamber 94 and an electric chamber 96 one above the other. The machine chamber 94 accommodates therein a dump actuator 98 for tilting the grass container 88 and a gate actuator 100 for opening and closing the gate plate 92 provided in a bottom part of the grass container 88. The dump actuator 98 is provided with a dump angle sensor 102 for detecting an inclination angle (dump angle) of the grass container 88 with respect to the device frame 72 from the operating state of the dump actuator 98.

The dump actuator 98 is formed by an electric linear actuator, and tilts the grass container 88 between a horizontal position where the bottom surface of the grass container 88 lay flat on the upper surface of the device frame 72 substantially horizontally as shown in FIG. 1, and a tilted position where the grass container 88 is tilted from the horizontal position around the central axial line of the support shaft 86 in clockwise direction to a rear end up posture. The dump actuator 98 is provided with a stopper 99 that abuts against the grass container 88 when the grass container 88 is in the horizontal posture.

The gate actuator 100 is formed by an electric motor, and is connected to the support shaft 86 via a gear train 101 in a power transmitting relationship. The gate actuator 100 rotates the gate plate 92 between a closed position (see FIGS. 1 and 5) for closing the content discharge opening 90A and an open position (see FIG. 6) rotated forward from the closed position around the support shaft 86. In the open position, the gate plate 92 slopes downward from the lower front side of the grass container 88 to serve as a chute for guiding the grass clippings to be unloaded from the grass container 88.

Since both the dump actuator 98 and the gate actuator 100 are provided in the machine chamber 94, these components can be serviced collectively or at the same time.

The electric chamber 96 is a waterproof and dustproof airtight chamber, and accommodates therein a device control unit 104, a GPS 106 (global positioning system, own position detection unit) for detecting the own position of the riding lawn mower 10 (the container device 70 when detached from the mower main body 20), an undercarriage angle sensor 108 using an acceleration sensor or a gyro sensor for detecting the tilt angle (undercarriage angle) of the undercarriage 78 relative to the horizontal plane, a wireless communication unit 110 for communication with the mower main body 20, a rechargeable battery 112, and a battery state of charge sensor 114 for detecting the remaining battery charge of the battery 112. Thus, the electric devices can be centrally managed in a single location of the electric chamber 96, and the electric wiring for these electric devices can be minimized.

The global positioning system that can be used by the container device 70 is not limited to the satellite GPS device, but may also be a measurement system using a camera (such as a camera 122 mounted on the riding lawn mower 10, and an external camera than can capture the image of the area traveled by the riding lawn mower 10), a measurement device using wireless communication (such as wireless LAN, and radio wave from a base station for mobile phones) and a radar.

The mower main body 20 is provided with a latch device (coupling unit) 130 for releasably connecting the container device 70 to the rear of the mower main body 20. The latch device 130 includes hook members 132 rotatable about an axis laterally extending in a rear end part of the main frame 22, and a latch actuator 134 including an electric motor for rotating the hook members 132. The gate plate 92 is formed with an engagement openings 136 with which the hook members 132 can be engaged. The latch actuator 134 is controlled by the main body control unit 54.

The hook members 132 can be rotationally driven by the latch actuator 134 between a release position shown in FIG. 1 and a connect position shown in FIG. 2, and are configured to engage the engagement openings 136 (see FIG. 4) as the container device 70 travels forward to the coupling position at the rear of the mower main body 20. Then, the hook members 132 are pivoted to the connect position so that the container device 70 is lifted upward with respect to the mower main body 20 while being connected to the mower main body 20. In this raised state of the container device 70, the front wheels 74 and rear wheels 76 are all lifted from the ground so that the front wheels 74 and rear wheels 76 do not affect the steering and traveling of the mower main body 20. When the container device 70 is connected to the mower main body 20, the grass container 88 is in the horizontal position, and the gate plate 92 is in the closed position.

The main frame 22 is provided with a detection switch 138 that detects the positioning of the container device 70 at the coupling position or the position suitable for coupling with the mower main body 20 by being pressed by the gate plate 92. Once the detection switch 138 detects that the container device 70 has arrived at the coupling position, the latch actuator 134 rotates the hook members 132 from the release position to the connect position.

A connection member 140 extends downward from the connection duct 52 at the rear end of the main frame 22. The lower end of the connection member 140 faces the front face of the device frame 72 in the raised state of the container device 70, and a signal line connector 142 is provided between the opposing parts of these two components to connect signal lines of the mower main body 20 with corresponding signal lines of the container device 70. In addition, between the connection member 140 and the device frame 72 is provided a power line connector 144 for connecting the battery 58 to the battery 112 in the raised state of the container device 70.

Figure 7:
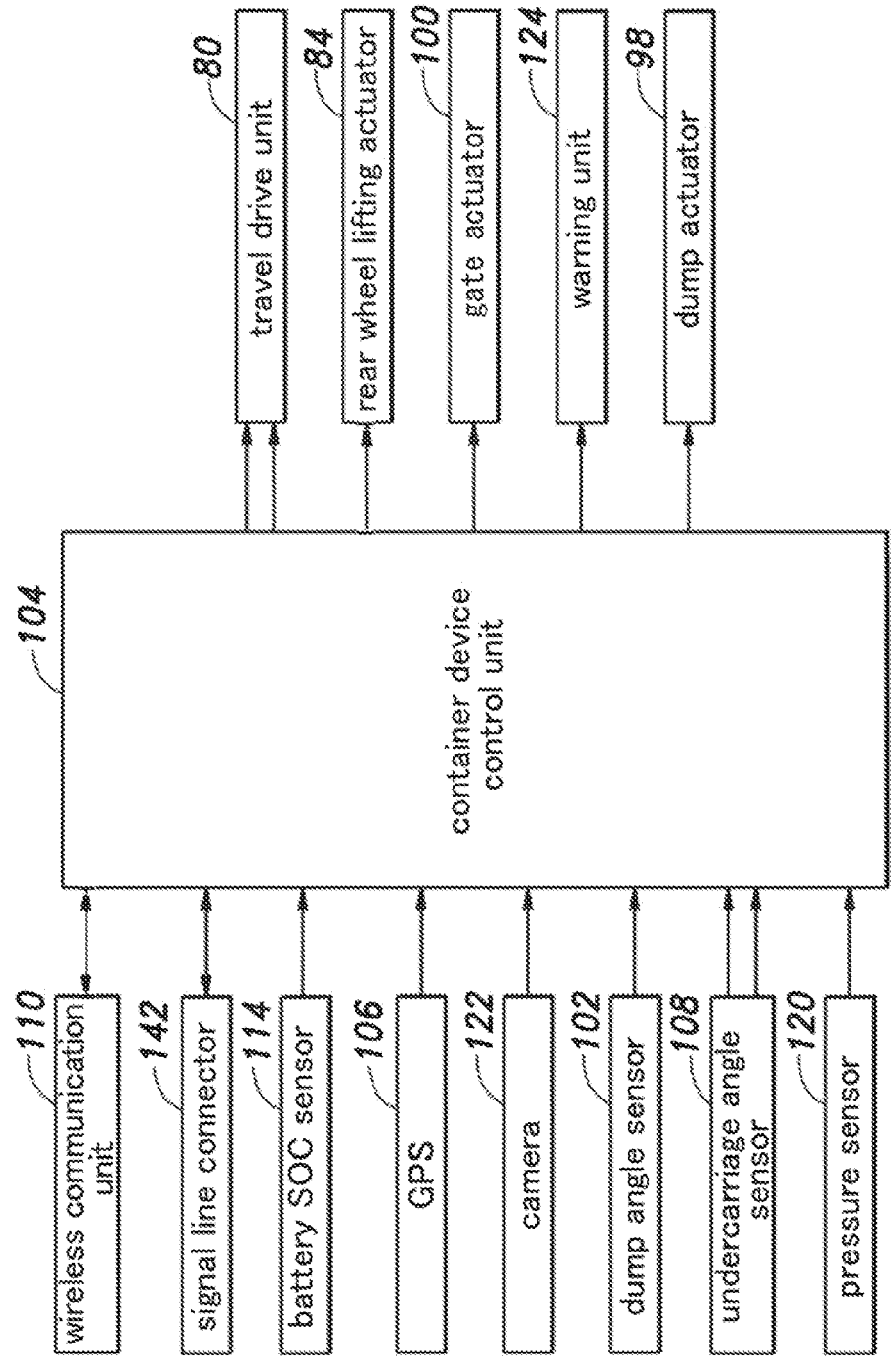
FIG. 7 is a block diagram of a control system of the riding lawn mower according to the present embodiment.

The container device control unit 104 is an electronic control device provided with a processor that executes the overall control process for the container device 70 according to a prescribed control program, and other pieces of hardware such as memory. As shown in FIG. 7, the container device control unit 104 is configured to receive signals from the dump angle sensor 102, the GPS 106, the undercarriage angle sensor 108, the battery state of charge sensor 114, the pressure sensor 120, and the signal line connector 142, and a video signal from the camera 122 to control the operation of the travel drive unit 80, the rear wheel lifting actuator 84, the gate actuator 100, and the warning unit 124. Further, a wireless communication unit 110 is connected to the container device control unit 104.

The battery 112 is a power source for all of the of the electric units of the container device 70 including the travel drive unit 80, and can be charged by the battery 112 via the power line connector 144 while being monitored by the battery state of charge sensor 114.

The mode of operation of the riding lawn mower 10 having the above described configuration is described in the following.

(Mowing Operation)

Figure 8:
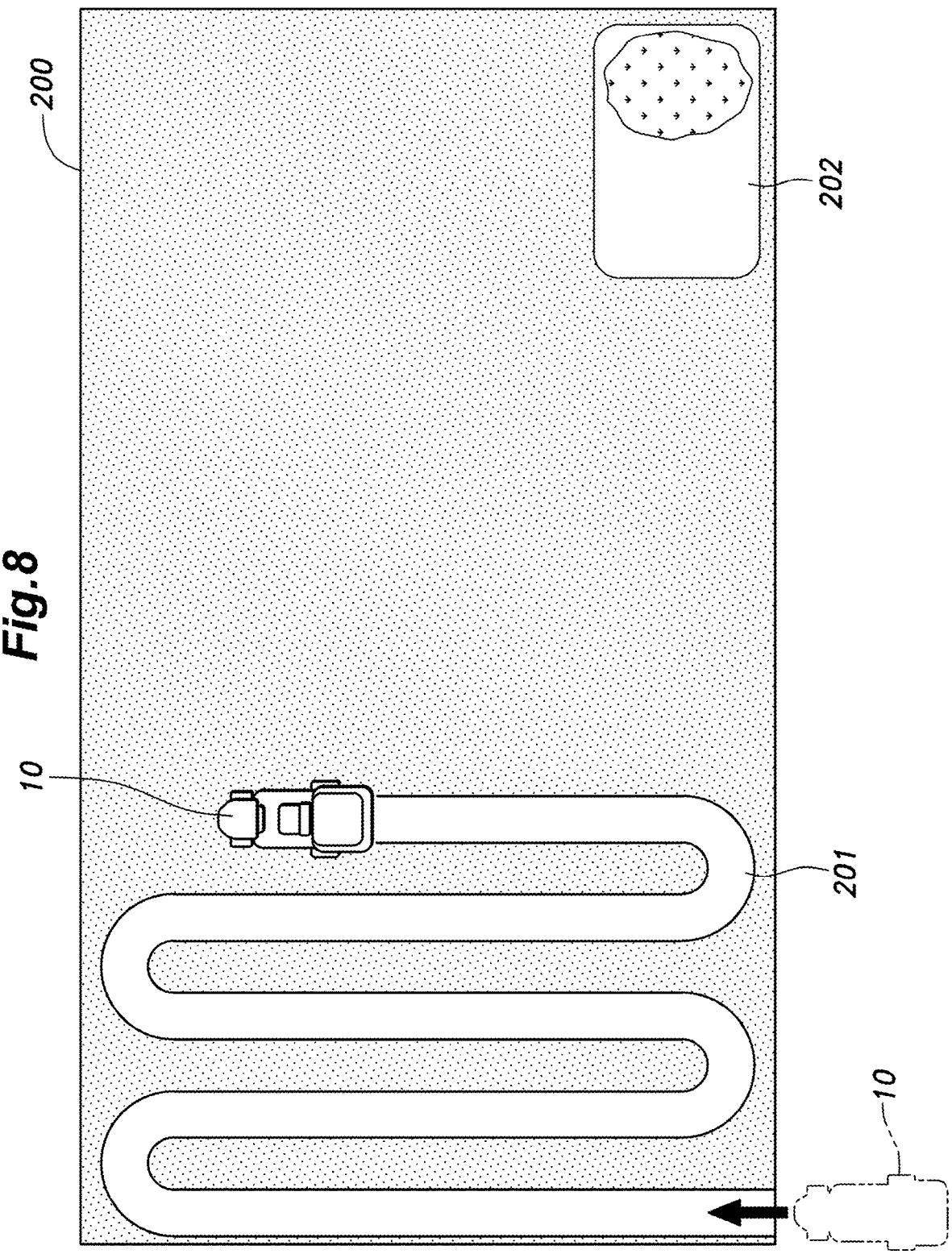
FIG. 8 is a diagram illustrating a lawn mowing operation of the riding lawn mower according to the present embodiment.

The riding lawn mower 10 is operated, for example, by traveling a desired work route 201 in a predetermined work area 200 to be mowed as shown in FIG. 8.

More specifically, as shown in FIG. 2, the mowing operation is performed while the container device 70 is connected to the mower main body 20 and is raised, and the rear wheels 76 are raised by the rear wheel lifting actuator 84. The mower main body 20 travels by means of the rear wheels 26 that are powered by the internal combustion engine 30. With the clutch 31 engaged, the internal combustion engine 30 rotates the fan 46 and the cutting blade 48. During the mowing operation, the front wheels 74 and the rear wheels 76 of the container device 70 are raised and not grounded so the front wheels 74 and the rear wheels 76 do not impede the traveling and steering of the mower main body 20 of the riding lawn mower 10.

The grass clippings mowed by the cutting blade 48 are carried by the air flow generated by the rotation of the cutting blade 48 and the fan 46, and is directed from the housing 42 to the connection duct 52 via the discharge duct 50 to be received by the grass receiving chamber 90 via the grass inlet opening 52A.

Figure 9:
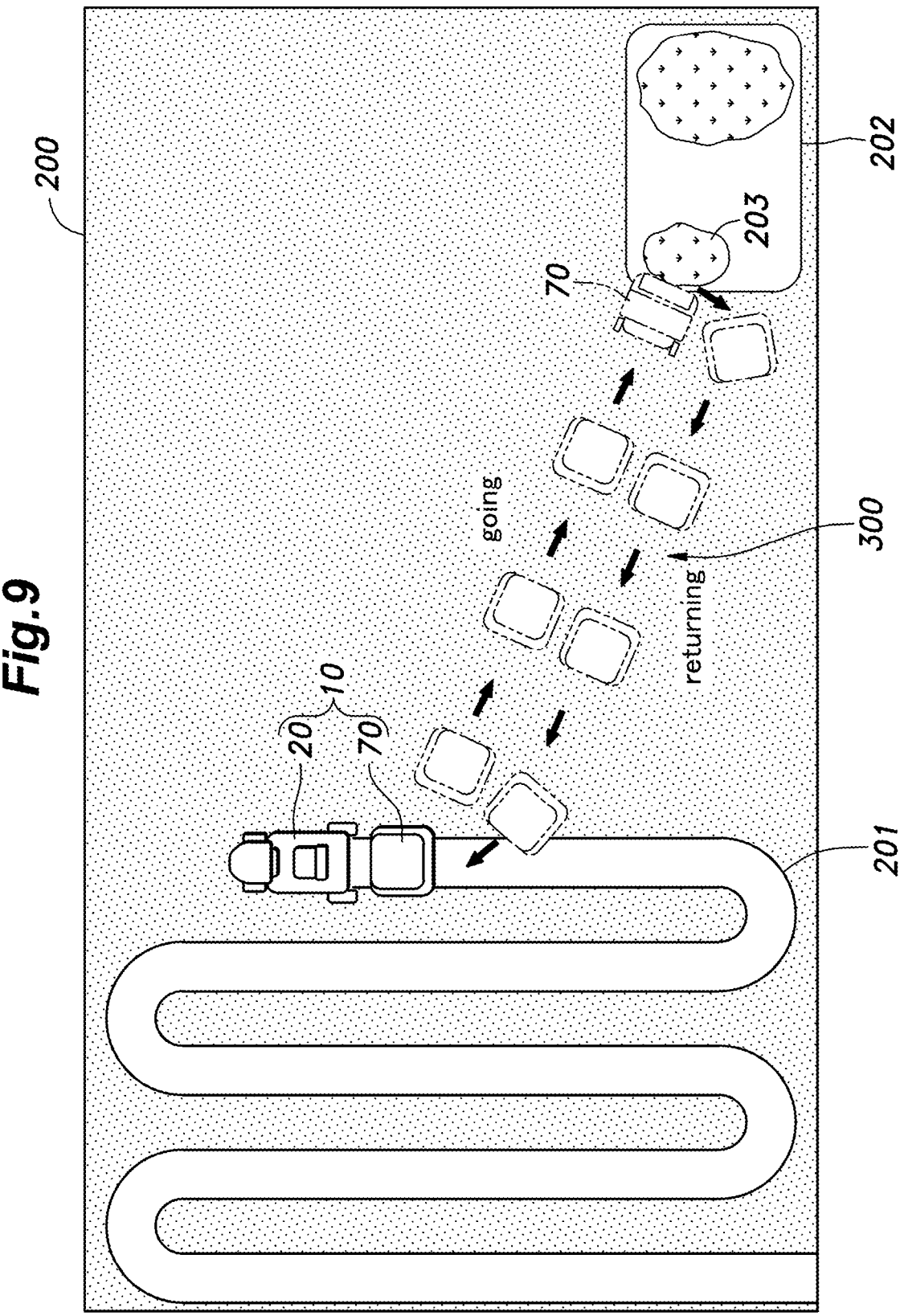
FIG. 9 is a diagram illustrating a grass dumping operation of the riding lawn mower according to the present embodiment.

As the mowing operation progresses, the grass clippings stored in the grass receiving chamber 90 increases to such an extent that the collected grass is required to be discarded. In this riding lawn mower 10, as shown in FIG. 9, the container device 70 is configured to detach from the mower main body 20, and to travel to and from the grass disposal area 202 (destination for the transportation of the collected article) autonomously. Furthermore, at the grass disposal area 202, the container device 70 is able to unload the mowed grass clippings 203 (deliver the collected article).

(Detachment of Grass Container Device)

In this riding lawn mower 10, when detaching the container device 70 from the mower main body 20, a detachment determination process is executed to determine if the container device 70 can be safely detached from the mower main body 20.

Figure 10:
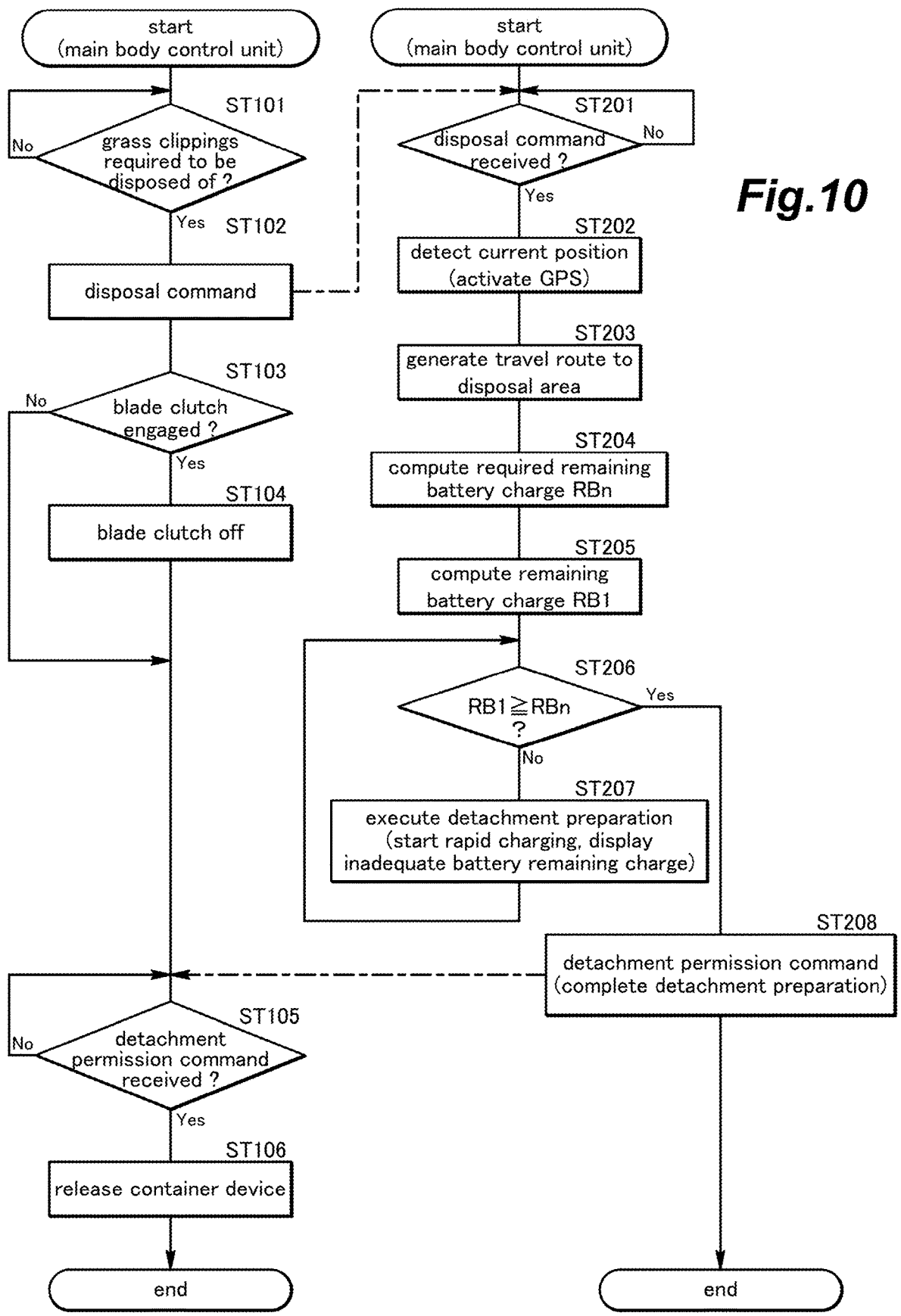
FIG. 10 is a flowchart showing a process of determining the detachment of the grass container device from the main body of the riding lawn mower according to the present invention.

In the detachment determination process, as shown in FIG. 10, first of all, the main body control unit 54 determines if the grass clippings received in the grass receiving chamber 90 are required to be discarded (if the collected article is required to be delivered) (ST101).

Figure 11:
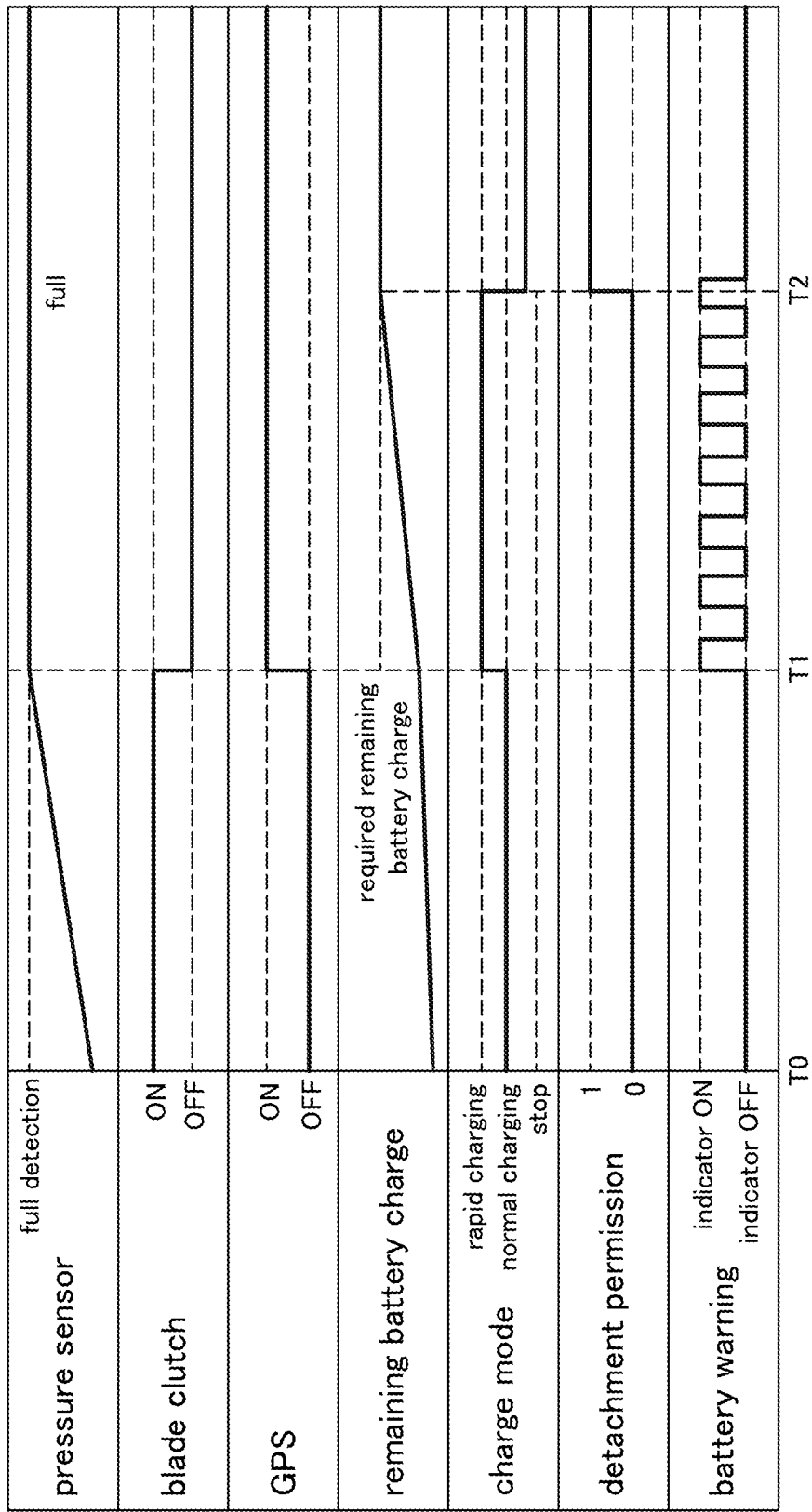
FIG. 11 is a diagram illustrating the modes of operation of various parts of the riding lawn mower according to the present embodiment.

With the progress of the mowing operation, the mowed grass clippings stored in the grass receiving chamber 90 increases to such an extent that the air space above the mowed grass clippings in the grass receiving chamber 90 progressively diminishes by the piling up of the mowed grass clippings. As shown in FIG. 11, from time T0 to time T1, the internal pressure of the grass receiving chamber 90 detected by the pressure sensor 120 increases with the decrease of the air space above the mowed grass clippings in the grass receiving chamber 90. Once the pile of the mowed grass clippings received in the grass receiving chamber 90 reaches a predetermined level close to a full level at time T1 in FIG. 11, the internal pressure of the grass receiving chamber 90 detected by the pressure sensor 120 reaches a prescribed value (in other words, a full state is detected), and a signal indicating this is transmitted to the main body control unit 54 via the signal line connector 142. Depending on if this signal is received or not, the main body control unit 54 executes a determination process in step ST101. It is shown in FIG. 11 that the operation states of various parts are simultaneously changed at time T1 and time T2 for the convenience of description, but in practice, some time differences may occur in the changes of states of the various parts.

The main body control unit 54 may also be configured such that the operator of the riding lawn mower 10 operates an unloading execution button (the delivery command button) displayed on the operation unit 60 as required, and the determination process of step ST101 is executed by the pressing of the unloading execution button (ie, unloading command).

If the main body control unit 54 determines in step ST101 that the mowed grass clippings are required to be disposed of (ST101: Yes), the main body control unit 54 sends a disposal command for the mowed grass clippings to the container device control unit 104 (ST102).

Thereafter, the main body control unit 54 determines the operating state of the clutch 31 in the power transmission path of the cutting blade 48, and if the clutch 31 is in the engaged state (ON) (ST103: Yes), sends a command to disengage (OFF) the clutch 31 (ST104). At this time, the main body control unit 54 may simultaneously send a command to stop the traveling of the mower main body 20. Thus, in the mower main body 20, the traveling of the mower main body 20 is stopped under the control of the main body control unit 54, and the clutch 31 is disengaged (see time T1 in FIG. 11), and the rotation of the fan 46 and the cutting blade 48 is stopped.

Meanwhile, if the container device control unit 104 receives a command to unload the mowed grass clippings from the main body control unit 54 (ST 201: Yes), the container device control unit 104 sends a start command to the GPS 106, and the GPS 106 is thereby activated to detect the current position of the riding lawn mower 10 which is stationary at this point, and generates position information of the riding lawn mower 10 (ST 202). Furthermore, the container device control unit 104 acquires the position information of the predetermined grass disposal area 202 from the memory (not shown in the drawings), and based on the current position of the riding lawn mower 10 and the location of the grass disposal area 202, generates a travel route from the current position to the grass disposal area 202 (ST203).

At this time, as shown in FIG. 9, the container device control unit 104 can compute the shortest route as the travel route by which the riding lawn mower 10 travels from the current position (departure point and returning point) to the grass disposal area 202, and then back to the current position. Alternatively, a plurality of candidates for the travel route are stored in the memory, and the container device control unit 104 selects one of the candidates for the travel route according to the current position of the riding lawn mower 10.

Figure 12:
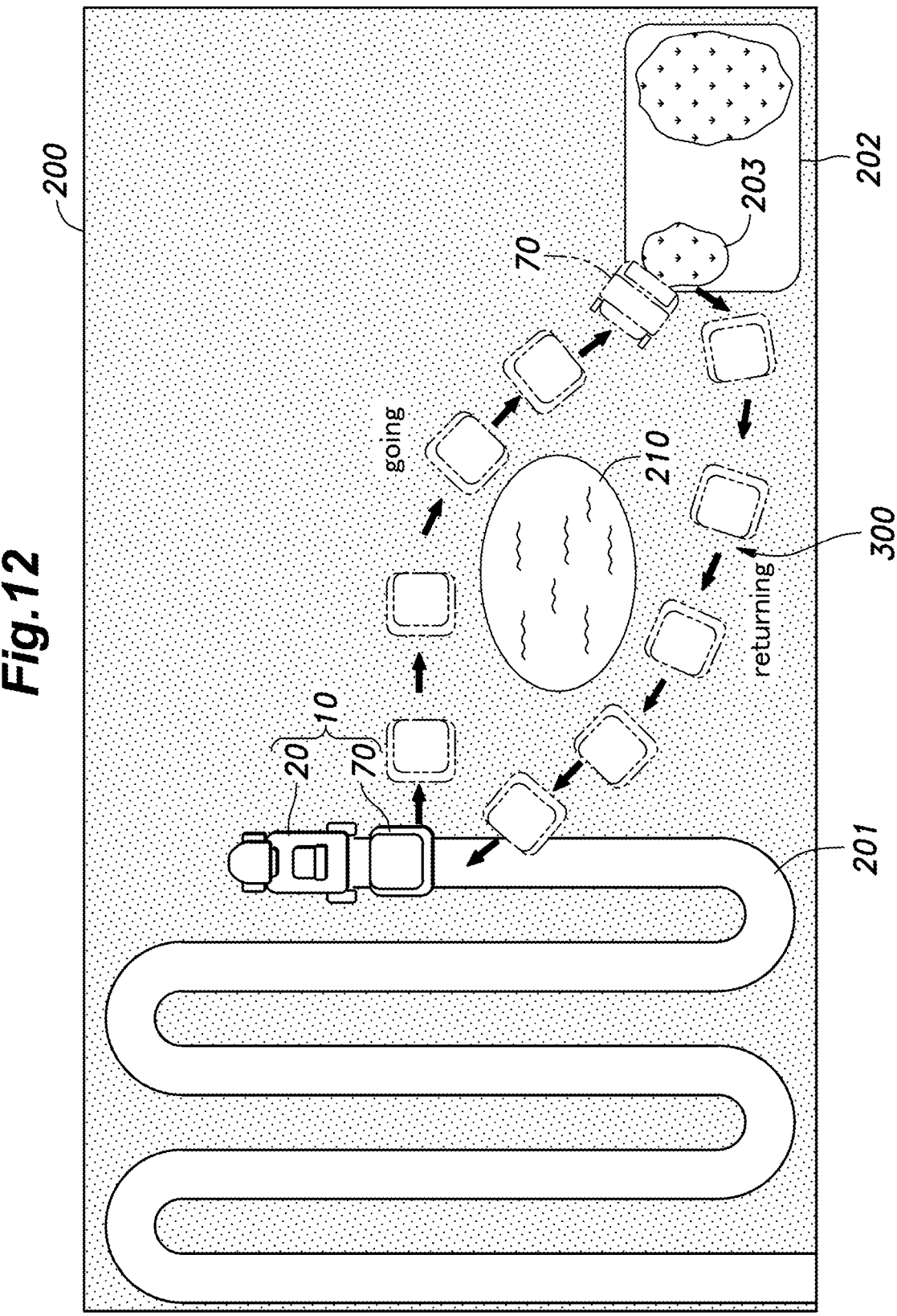
FIG. 12 is a diagram illustrating a grass dumping operation of a riding mower according to a modified embodiment of the present invention.

Further, as shown in FIG. 12, when there is a known obstacle 210 (a pond in this case) in the work area 200, the riding lawn mower 10 may have previously stored position information of the obstacle in memory or the like. In such a case, the container device control unit 104 can compute (or select) the shortest route while avoiding the obstacle as the shortest travel route based on the position information of the obstacle.

Thereafter, the container device control unit 104 computes the remaining charge $RB_n$ of the battery 112 (hereinafter referred to as "required remaining battery charge") that is required for taking the route determined in step ST203 according to the length of the route to be taken (ST 204). The required remaining battery charge may be computed based not only on the length of the route to be taken but also the road condition and the weight of the mowed grass clippings (collected article).

At this time, the container device control unit 104 may determine the required remaining battery charge RBn as a sum of a first remaining battery charge required for autonomously traveling the route determined in step ST203, a second remaining battery charge required for the dumping operation of the mowed grass clippings, and a prescribed remaining battery charge reserve. The first remaining battery charge can be computed appropriately, and the second remaining battery charge and the remaining battery charge reserve can be fixed values determined in advance (or may be values that can be looked up from look up tables that are prepared in advance).

Thereafter, the container device control unit 104 detects the current remaining battery charge RB1 of the battery 112 with the battery state of charge sensor 114 (ST205), and determines if the current remaining battery charge RB1 is equal to or more than the required remaining battery charge RBn (i.e., if the autonomous traveling of the container device 70 can be permitted or not (ST206)).

In step ST206, if the current remaining battery charge RB1 is less than the required remaining battery charge RBn (ST206: No) as in the case of time T1 in FIG. 11, for example, the container device control unit 104 determines that the autonomous traveling of the container device 70 cannot be permitted (while keeping the flag for permitting detachment shown in FIG. 11 to be zero), and a detachment preparation operation is performed to enable detachment of the container device 70 (ST 207).

In the detachment preparation operation of step ST207, the container device control unit 104 charges the battery 112. Here, the container device control unit 104 can execute a normal charge mode for charging the battery 112 at a predetermined first current value, and a rapid change mode for charging the battery 112 at a second current value larger than the first current value. The normal charge mode may be executed prior to the start of the detachment preparation operation (refer to the battery state of charge from time T0 to time T1 in FIG. 11), and the quick charge mode may be executed during the detachment preparation operation (refer to the battery state of charge following time T1 in FIG. 11). The first and second current values are not necessarily required to be constant values.

In the detachment preparation operation, the container device control unit 104 can issue a warning to the driver (operator) to notify the shortage of remaining charge of the battery 112 by using at least one of audio output and image display (including character display) provided by the operation unit 60. In this case, the indicator can be blinked at a predetermined time interval (see the battery warning from time T1 to time T2 in FIG. 11). The container device control unit 104 may issue such a warning regarding the remaining charge of the battery 112 by emitting light (blinking light) from the warning unit 124. Alternatively, the container device control unit 104 may transmit a notification that the remaining charge of the battery 112 is insufficient to a portable terminal (for example, a mobile phone) carried by the operator via the wireless communication unit 110.

Thereafter, if it is determined that the current remaining battery charge RB1 is equal to or greater than the required remaining battery charge RBn in step ST206 owing to the increase in the remaining charge level of the battery 112 (ST206: Yes), the container device control unit 104 determines that the autonomous traveling of the container device 70 can be permitted. Thus, the detachment preparation operation is ended so that as shown at time T2 in FIG. 11 (the detachment permission flag is changed from 0 to 1), a departure permission command is sent to the main body control unit 54 (ST208). Following the permission of the detachment operation, the container device control unit 104 may cancel the operation of the pressure sensor 120 (by stopping the operation of the pressure sensor 12 or ignoring the signal from the pressure sensor 120).

Upon receiving the detachment permission command from the container device control unit 104 (ST105: Yes), the main body control unit 54 controls the operation of the latch device 130 so as to release the connection of the container device 70. At this time, the rear wheels 76 are lowered to the grounded position by the rear wheel lifting actuator 84, and the hook members 132 are pivoted to the release position shown in FIG. 1 by the latch actuator 134. As a result, as shown in FIG. 1, the container device 70 can be detached from the mower main body 20 with the front wheels 74 and the rear wheels 76 grounded.

Once the hook members 132 are pivoted to the release position, the container device 70 is moved backward relative to the mower main body 20 by the driving of the rear wheels 76 by the travel drive unit 80 under the control of the container device control unit 104 with the result that the container device 70 is separated from the mower main body 20. This concludes the various steps of the detachment operation of the container device 70.

(Autonomous Traveling of the Grass Container Device and Disposal of the Mowed Grass Clippings)

Figure 5:
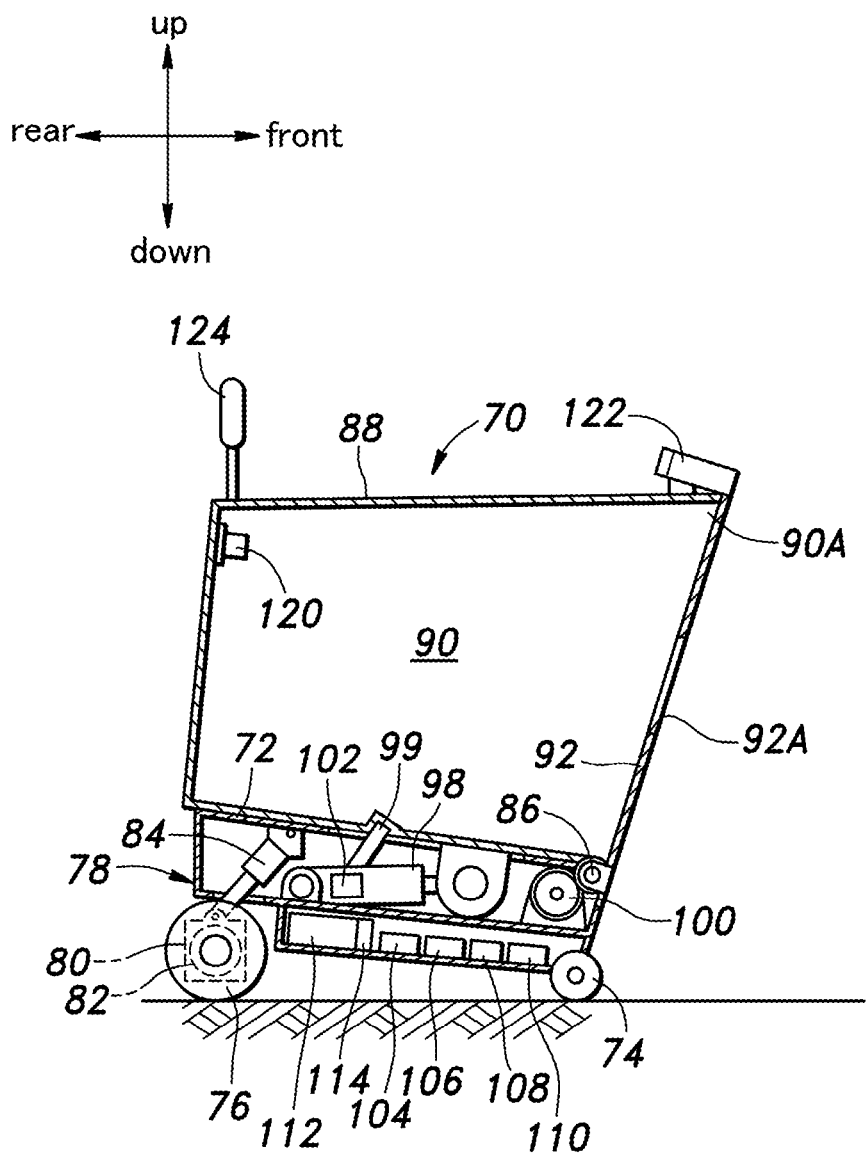
FIG. 5 is a sectional side view of the container device of the riding lawn mower according to the present embodiment when detached from the riding lawn mower.
Figure 6:
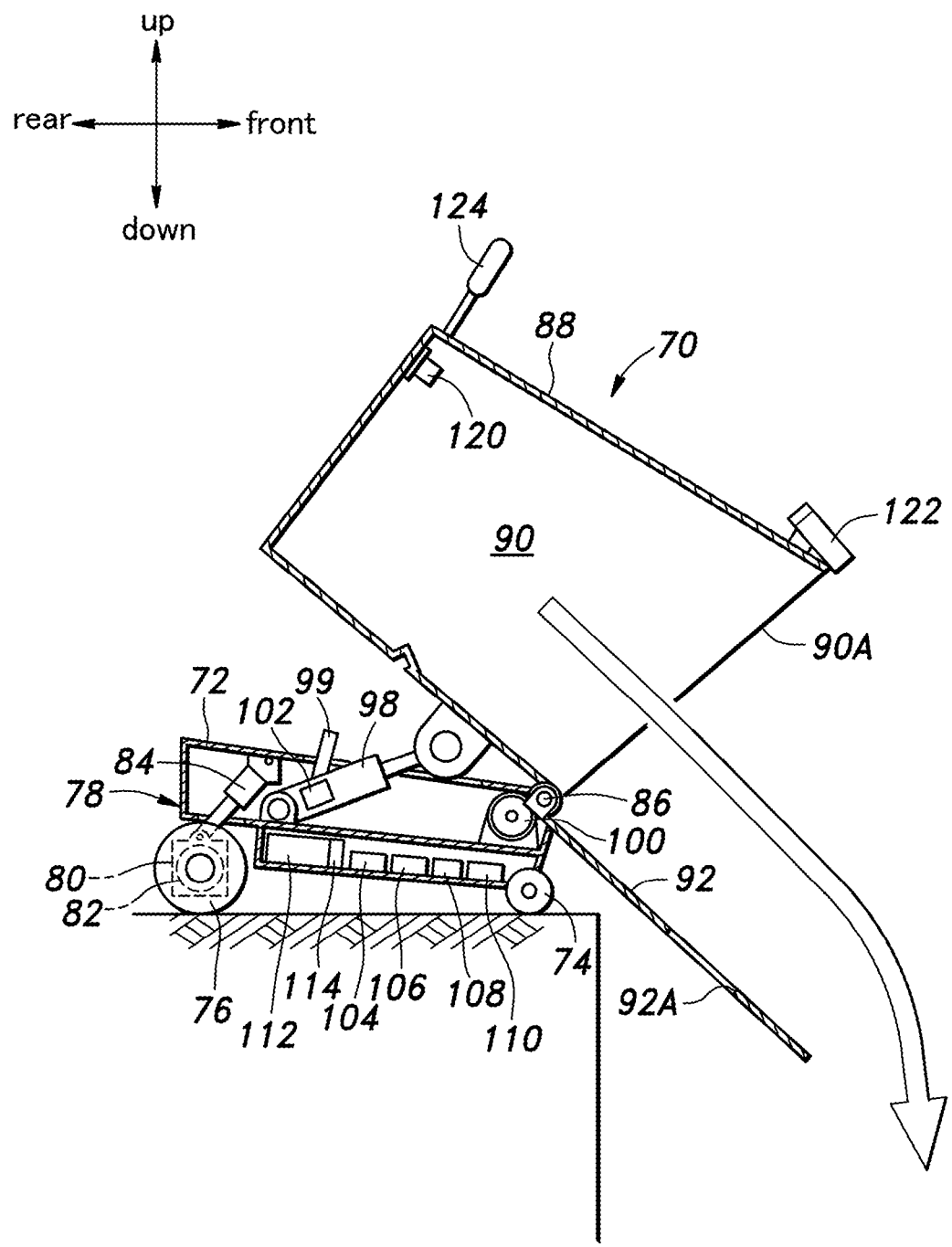
FIG. 6 is a sectional side view of the container device of the riding lawn mower according to the present embodiment when dumping the grass.

Upon completion of the detachment operation, the container device control unit 104 starts the autonomous traveling of the container device 70, and the drive unit 80 drives the left and right rear wheels 76 individually under the control of the container device control unit 104 so that the container device 70 travels along the given travel route. Thus, the container device 70 travels by itself as shown in FIG. 5 along the given route 300 (both ways) to the grass disposal area 202 as shown in FIG. 9 or FIG. 10 in a per se known autonomous fashion. The turning or other direction changing maneuver of the container device 70 is accomplished by driving the rear wheels 76 at mutually different speeds with the drive unit 80.

Upon arriving at the grass disposal area 202, the container device 70 comes to a stop, and the dump actuator 98 is driven so as to tilt the grass container 88 into a rear end up condition while the gate actuator 100 drives the gate plate 92 to the open position. As a result, the mowed grass clippings received in the grass receiving chamber 90 are discharged from the content discharge opening 90A with the gate plate 92 serving as a chute, and the mowed grass clippings are disposed of by being deposited in the grass disposal area 202.

After elapsing of a prescribed time period following the opening of the gate plate 92, the container device control unit 104 determines that the disposal of the mowed grass clippings has been completed, and drives the dump actuator 98 in the reverse direction to restore the grass container 88 to the original horizontal position, and drives the gate actuator 100 in the reverse direction to restore the gate plate 92 to the original closed position. As a result, the container device 70 returns to the state shown in FIG. 5. The timing for restoring the grass container 88 to the original horizontal position and closing the gate plate 92 may also be determined by monitoring the discharge state of the mowed grass clippings with the video signal (captured image) of the camera 122.

Thereafter, the container device 70 autonomously travels by itself as shown in FIG. 4 to the original position along the travel route by individually driving the rear wheels 76 with the travel drive unit 80.

When the container device control unit 104 is autonomously traveling either toward the destination or back to the riding lawn mower 10, the container device control unit 104 monitors the surrounding environment of the container device 70 based on the image signal of the camera 122, and when an obstacle is detected in the travel route, changes the travel route to and from the destination so as to avoid the obstacle. Thereby, the container device control unit 104 prevents a collision with the obstacle or the like. It may be arranged such that the image signal of the camera 122 is transmitted to the wireless communication unit 56 of the mower main body 20, and the surrounding environment of the container device control unit 104 is displayed on the operation unit 60.

Once the container device 70 returns to the position (original point) of the mower main body 20, the container device 70 moves forward by a predetermined distance from immediately behind the mower main body 20. When the detection switch 138 is pushed by the forward movement of the container device 70, the latch actuator 134 is driven under the control of the main body control unit 54, and the hook members 132 are rotated from the release position to the coupling position. Under the control of the container device control unit 104, the rear wheel lifting actuator 84 is driven to move the rear wheels 76 to the raised position. As a result, as shown in FIG. 2, the container device 70 returns to the coupled state with the mower main body 20, and the mowing operation can be resumed.

In the case where the container device control unit 104 has come to a stop due to any obstacle on the way to the destination or on the way back, or where a failure of a dumping operation of the grass container 88 or the gate plate 92 has occurred, the warning unit 124 is activated to notify the operator by light or sound.

It may be arranged such that the image signal of the camera 122 is transmitted to the wireless communication unit 56 of the mower main body 20 by the wireless communication unit 110 of the container device control unit 104, and the surrounding environment of the container device control unit 104 is displayed on the operation unit 60. In such a case, the container device 70 may be remotely controlled by wireless communication from the mower main body 20 with the aid of the screen display of the surrounding environment of the container device control unit 104.

As described above, since the disposal of the mowed grass clippings is performed solely by the lawn container device 70 which is detached from the mower main body 20, the disposal of the mowed grass clippings can be performed with little burden on the part of the operator with the added advantages of a higher energy efficiency and a higher work efficiency.

The present invention has been described in terms of a specific embodiment, but is not limited by such an embodiment, and can be modified in various ways without departing from the spirit of the present invention. For example, the detection of the amount of mowed grass clippings received in the grass receiving chamber is not limited to using a pressure sensor, but may also be performed by using a level gauge that detects the height of the pile of the mowed grass clippings received in the grass receiving chamber or a weight sensor that measure the weight of the mowed grass clippings received in the grass receiving chamber. The work equipment of the present invention is not limited to a riding lawn mower but may also be other forms of work equipment such as a grass cutter, a harvester and a sweeper. In such a case, the article to be collected may be grass, crop or trash. The various control processes performed by the main body control unit and the container device control unit can be performed by one of them or the other, and may also be performed by an external control device that can communicate with the riding lawn mower.

GLOSSARY OF TERMS

| | |
|---|---|
| 10: riding lawn mower | 20: mower main body |
| 31: clutch | 38: driver's seat |
| 40: cutting blade device | 44: rotary shaft |
| 45: belt transmission mechanism | 48: cutting blade |
| 50: discharge duct | 52: connection duct |
| 54: main body control unit | 56: wireless communication unit |
| 58: battery | 60: operation unit |
| 66: shutter | 68: shutter actuator |
| 70: grass container device | 80: travel drive unit |
| 84: rear wheel lifting actuator | 88: grass container |
| 90: grass receiving chamber | 90A: collected article discharge opening |
| 92: gate plate (opening/closing door) | 98: dump actuator |
| 100: gate actuator | 104: container device control unit |
| 106: GPS | 108: undercarriage angle sensor |
| 110: wireless communication unit | 112: battery |
| 114: battery state of charge sensor | 120: pressure sensor |
| 122: camera | 124: warning unit |
| 130: latch device | 132: hook member |
| 134: latch actuator | 136: engagement opening |
| 138: detection switch | 140: connection member |
| 200: work area | 201: work route |
| 202: grass disposal area | 203: mowed grass clippings |

The invention claimed is:

1. Work equipment that can temporarily store an article that is collected while traveling, comprising:
   a work equipment main body;
   a container device configured to store the article collected by the work equipment main body while being connected to the work equipment main body, and to travel to and back from a collected article destination by being detached from the work equipment main body;
   a travel drive unit configured to cause the container device to travel;
   a battery mounted to the container device to power the travel drive unit;
   a battery state of charge sensor configured to detect a remaining battery charge of the battery; and
   a control unit configured to perform determination of whether the container device is able to be detached from the work equipment main body or not according to the remaining battery charge.

2. The work equipment according to claim 1, further comprising an own position detection unit configured to generate position information of the work equipment, wherein the control unit is configured to determine a required remaining battery charge that is required for the container device to travel according to a current position of the work equipment in a stationary state provided by the position information and a position of the collected article destination, and to permit the container device to be detached from the work equipment main body when the detected remaining battery charge is equal to or greater than the required remaining battery charge.

3. The work equipment according to claim 2, wherein the control unit is configured to determine a travel route for the container device to travel to the collected article destination and back to the work equipment main body according to the current position of the work equipment in the stationary state and the position of the collected article destination, and to determine the required remaining battery charge according to a length of the travel route.

4. The work equipment according to claim 3, wherein the control unit is configured to acquire position information on an obstacle that is located between the current position of the work equipment main body in the stationary state and the collected article destination, and determine the travel route so as to avoid the obstacle.

5. The work equipment according to claim 3, wherein the container device is configured to unload the collected article at the collected article destination, and the control unit is configured to determine the required remaining battery charge as a sum of a first remaining battery charge that is required for the container device to travel the travel route, a second remaining battery charge that is required for unloading the collected article, and a prescribed remaining battery charge reserve.

6. The work equipment according to claim 2, further comprising an article collection state sensor for detecting an article collection state of the container device, wherein when detachment of the container device from the work equipment main body is permitted according the remaining battery charge, the control unit is configured to neutralize the article collection state sensor.

7. The work equipment according to claim 2, further comprising an article collection state sensor for detecting an article collection state of the container device, wherein the own position detection unit is configured to be activated according to a detection result of the article collection state sensor.

8. The work equipment according to claim 2, wherein when detachment of the container device from the work equipment main body is not permitted according to the remaining battery charge, the control unit is configured to charge the battery until the remaining battery charge reaches the required remaining battery charge.

9. The work equipment according to claim 8, wherein the control unit is configured to execute a normal charging mode for charging the battery at a first electric current value, and a rapid charging mode for charging the battery at a second electric current value greater than the first electric current value, and to execute the rapid charging mode when detachment of the container device from the work equipment main body is not permitted according to the remaining battery charge.

10. The work equipment according to claim 2, further comprising a coupling device for detachably coupling the container device to the work equipment main body, wherein the control unit is configured to control the coupling device so as to detach the container device when detachment of the container device from the work equipment main body is permitted according to the remaining battery charge.

11. The work equipment according to claim 2, further comprising a collection device provided on the work equipment main body for performing a collecting operation for collecting the article to be collected, wherein the control unit is configured to control the collection device so as to stop the collecting operation when the remaining battery charge is greater than or equal to the required remaining battery charge.

12. The work equipment according to claim 1, further comprising a notifying unit that notifies an operator a result of the determination performed by the control unit by using at least one of light emission, audio output, and image display.

13. The work equipment according to claim 4, wherein the container device is configured to unload the collected article at the collected article destination, and the control unit is configured to determine the required remaining battery charge as a sum of a first remaining battery charge that is required for the container device to travel the travel route, a second remaining battery charge that is required for unloading the collected article, and a prescribed remaining battery charge reserve.

14. The work equipment according to claim 3, further comprising an article collection state sensor for detecting an article collection state of the container device, wherein when detachment of the container device from the work equipment main body is permitted according the remaining battery charge, the control unit is configured to neutralize the article collection state sensor.

15. The work equipment according to claim 4, further comprising an article collection state sensor for detecting an article collection state of the container device, wherein when detachment of the container device from the work equipment main body is permitted according the remaining battery charge, the control unit is configured to neutralize the article collection state sensor.

16. The work equipment according to claim 5, further comprising an article collection state sensor for detecting an article collection state of the container device, wherein when detachment of the container device from the work equipment main body is permitted according the remaining battery charge, the control unit is configured to neutralize the article collection state sensor.

17. The work equipment according to claim 13, further comprising an article collection state sensor for detecting an article collection state of the container device, wherein when detachment of the container device from the work equipment main body is permitted according the remaining battery charge, the control unit is configured to neutralize the article collection state sensor.

18. The work equipment according to claim 3, further comprising an article collection state sensor for detecting an article collection state of the container device, wherein the own position detection unit is configured to be activated according to a detection result of the article collection state sensor.

19. The work equipment according to claim 4, further comprising an article collection state sensor for detecting an article collection state of the container device, wherein the own position detection unit is configured to be activated according to a detection result of the article collection state sensor.

20. The work equipment according to claim 5, further comprising an article collection state sensor for detecting an article collection state of the container device, wherein the own position detection unit is configured to be activated according to a detection result of the article collection state sensor.

* * * * *